(12) United States Patent
Vetters

(10) Patent No.: US 8,540,481 B2
(45) Date of Patent: Sep. 24, 2013

(54) ROTOR BLADE ASSEMBLY

(75) Inventor: Daniel Kent Vetters, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 677 days.

(21) Appl. No.: 12/758,856

(22) Filed: Apr. 13, 2010

(65) Prior Publication Data

US 2011/0250075 A1 Oct. 13, 2011

(51) Int. Cl.
*F01D 5/14* (2006.01)
(52) U.S. Cl.
USPC ........... 415/116; 416/209; 416/224; 416/239; 416/241 R
(58) Field of Classification Search
USPC ............. 415/182, 209, 214 R, 224, 232, 233, 415/239, 241 R, 116; 416/182, 209, 214 R, 416/224, 232, 233, 239, 241 R
See application file for complete search history.

(56) References Cited

U.S. PATENT DOCUMENTS

| | | | | |
|---|---|---|---|---|
| 2,586,054 A | * | 2/1952 | Jonas | 416/90 R |
| 2,623,599 A | * | 12/1952 | Kearns, Jr. | 416/239 |
| 3,734,642 A | * | 5/1973 | Dixon | 416/61 |
| 4,732,538 A | * | 3/1988 | Wollenweber et al. | 416/94 |
| 4,789,304 A | * | 12/1988 | Gustafson et al. | 416/95 |
| 4,842,663 A | | 6/1989 | Kramer | |
| 4,930,725 A | * | 6/1990 | Thompson et al. | 244/53 R |
| 5,174,024 A | | 12/1992 | Sterrett | |
| 5,222,297 A | * | 6/1993 | Graff et al. | 29/889.71 |
| 5,306,120 A | | 4/1994 | Hammer et al. | |
| 5,542,820 A | | 8/1996 | Eaton et al. | |
| 5,782,607 A | | 7/1998 | Smith et al. | |
| 5,908,522 A | | 6/1999 | Lofstrom et al. | |
| 6,565,312 B1 | | 5/2003 | Horn et al. | |
| 7,581,933 B2 | | 9/2009 | Bruce et al. | |
| 2002/0106275 A1 | | 8/2002 | Harvey | |
| 2005/0265836 A1 | | 12/2005 | Mongillo, Jr. et al. | |
| 2009/0169395 A1 | | 7/2009 | Wilson, Jr. et al. | |
| 2009/0202357 A1 | * | 8/2009 | Stern | 416/97 R |
| 2010/0202892 A1 | * | 8/2010 | Perkinson | 416/245 R |
| 2011/0243746 A1 | * | 10/2011 | Liotta et al. | 416/214 R |

OTHER PUBLICATIONS

International Search Report and Written Opinion, PCT/US2011/032286, Rolls-Royce North American Technologies Inc., Jun. 28, 2011.

* cited by examiner

*Primary Examiner* — Edward Look
*Assistant Examiner* — Liam McDowell
(74) *Attorney, Agent, or Firm* — Krieg DeVault LLP

(57) ABSTRACT

A rotor blade assembly is disclosed herein. The rotor blade assembly includes a composite blade portion extending a length from a root to a tip. A leading edge of the composite blade portion extends from the tip to an end point along the length between the tip and the root. The rotor blade assembly also includes a base portion fixed to the composite blade portion proximate to the root. The rotor blade assembly also includes a sheath extending around the composite blade portion. The sheath is positioned along the length adjacent to the base portion and between the root and the end point of the leading edge.

17 Claims, 4 Drawing Sheets

ROTOR BLADE ASSEMBLY

BACKGROUND OF THE INVENTION

1. Field of the Invention

The invention relates to an assembly including a rotor blade.

2. Description of Related Prior Art

U.S. Pat. No. 5,306,120 discloses a system to protect against erosion of a body subjected to airflow. The system consists essentially of a fibrous material or a fiber-reinforced plastic material, such as a rotor blade, having a metallic coating which, in the respective area to be protected, covers the surface in several layers. The primary layer of the coating consists of aluminum or a similar material with a modulus of elasticity that is approximately identical to that of the material on the surface of the body. The primary layer, in the form of a sheet glued to the surface, is coated with a two-phase material, in which particles of metallic oxide and/or metallic carbide and/or metallic nitride compounds are embedded in a finely distributed manner in a ductile, solid-solution-hardened matrix of a metallic but non-ferrous material.

SUMMARY OF THE INVENTION

In summary, the invention is a rotor blade assembly. The rotor blade assembly includes a composite blade portion extending a length from a root to a tip. A leading edge of the composite blade portion extends from the tip to an end point along the length between the tip and the root. The rotor blade assembly also includes a base portion fixed to the composite blade portion proximate to the root. The rotor blade assembly also includes a sheath extending around the composite blade portion. The sheath is positioned along the length adjacent to the base portion and between the root and the end point of the leading edge.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
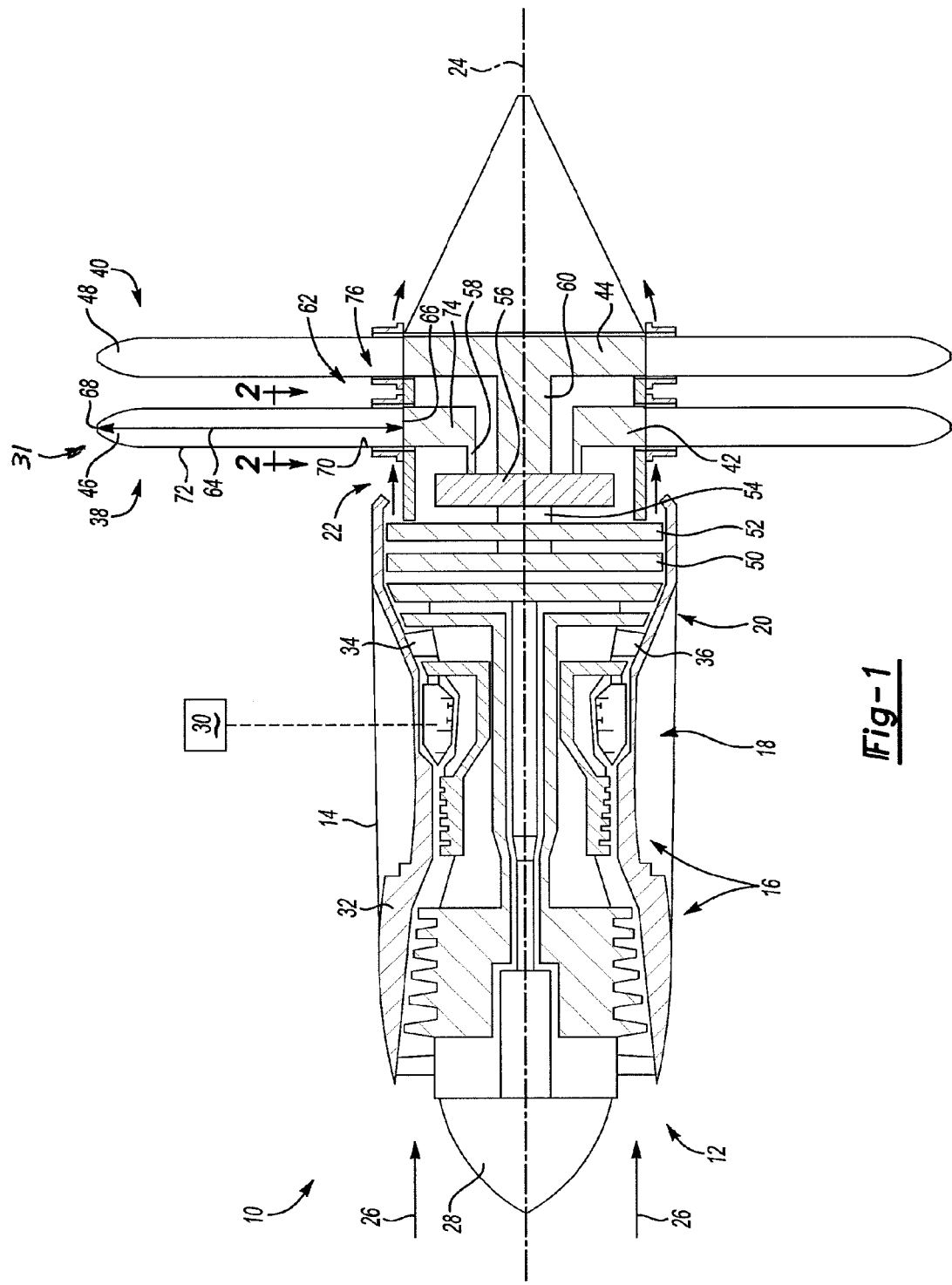
FIG. 1 is a schematic representation of a turbine engine incorporating an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Rotor or propeller blades can be made of composite material with relatively low temperature capability. However, a pusher rotor configuration which places the open rotor blades downstream from the core engine can have significant advantages over other engine configurations. Plumbing the exhaust through the rotor module can be problematic, leading to higher weight and cost. The higher diameter and weight rotor hubs can also lead to higher gyroscopic moments, necessitating larger, heavier shafting and bearings.

The invention, as exemplified in several embodiments, would permit the pusher rotor configuration to dump the exhaust upstream of the blades, thereby enabling a lower weight and lower cost solution. The invention can also be applied to provide sacrificial protection for a composite blade. Damage from debris in the exhaust stream would be done to a replaceable protective sheath rather than the composite blade. An upstream dump of the exhaust would also enable a variable area nozzle since the core engine nozzle would now reside in a static environment rather than a rotating environment, making the task of creating a variable area nozzle much easier.

FIG. 1 is a schematic representation of a turbine engine incorporating a first exemplary embodiment of the invention. A turbine engine 10 can include an inlet 12 and be housed in a nacelle 14. The turbine engine 10 can also include a compressor section 16, a combustor section 18, and a turbine section 20. The turbine engine 10 can also include an exhaust section 22. The compressor section 16, combustor section 18, turbine section 20, and exhaust section 22 can be arranged along a centerline axis 24. Components of the compressor section 16 and the turbine section 20 can rotate about the centerline axis 24. Fluid such as air can be drawn into the turbine engine 10 as indicated by the arrows referenced at 26. The fluid enters the compressor section 16 from the inlet 12 and is compressed. A nose cone 28 can be proximate to the inlet 12 to gently direct air into the compressor section 16. The schematically shown compressor section 16 includes high and low pressure compressor sections. In some embodiments, a portion of the fluid can be diverted radially outside of the compressor section 16 and thereby become bypass flow. The compressed fluid emerging from the compressor section 16 is mixed with fuel from a fuel system 30 and ignited in the combustor section 18. Combustion gases exit the combustor section 18 and flow through the turbine section 20. Energy is extracted from the combustion gases in the turbine section 20.

A turbine case 32 can encircle the core engine components (the compressor, combustor and turbine sections 16, 18, 20). The case 32 can support non-rotating structures such as compressor vanes (not shown) and turbine vanes. Exemplary turbine vanes are referenced at 34 and 36 and can be positioned to direct the flow of combustion gases to the turbine section 20. The combustion gases passing aft of the turbine section 20 are referenced by unnumbered arrows.

In the open rotor configuration shown in FIG. 1, power can be drawn from the free power turbine components to rotate rotors 38, 40. Each of the rotors respectively includes a hub portion 42, 44 and a plurality of blades, such as blades 46, 48. One or more of the blades 46, 48 can be formed as a composite of materials, such as a fiber-reinforced resin 31 with a unidirectional carbon fiber in an epoxy matrix, or a woven fiberglass in an epoxy matrix. Various fiber-reinforced resins can be combined in a single composite blade, such as by laying up unidirectional carbon/epoxy as an interior body portion and woven fiberglass/epoxy as a ductile skin over the surface of interior body portion. In the exemplary embodiment, one or more free power turbines, such as turbines 50, 52 can drive a shaft 54. Combustion gases pass over and thereby cause rotation of the free power turbines 50, 52.

The shaft 54 can extend into a gear box 56. Respective drive shafts 58, 60 can extend from the gear box 56. The drive shaft 58 is fixed for rotation with the hub portion 42 of the rotor 38. The drive shaft 60 is fixed for rotation with the hub portion 44 of the rotor 40. In operation, the gears (not shown) of the gear box 54 can transmit the power input by the shaft 54 into counter-rotation of the rotors 38 and 40. The schematic illustration of FIG. 1 is a "pusher" open rotor configuration and it is noted that embodiments of the invention can be practiced with "tractor" open rotor configuration wherein the rotors are forward/upstream of the compressor section.

FIG. 1 also shows a first exemplary embodiment of the invention. A rotor blade assembly 62 includes the composite blade portion 46 extending a length 64 from a root 66 to a tip 68. A leading edge 72 of the composite blade portion 46 extends from the tip 68 to an end point 70 along the length 64 between the tip 68 and the root 66. The leading edge 72 can be defined by a relatively sharp edge or can be defined simply along the forward edge of the composite blade portion 46 that engages the air.

The rotor blade assembly 62 also includes a base portion 74 fixed to the composite blade portion 46 proximate to the root 66. The base portion can be a hub attached to a plurality of blades, such as the hub portion 42 of the first exemplary embodiment of the invention. Alternatively, the base portion can be fixed to a single composite blade portion, such as the base portion 74*d* shown in FIG. 6 of another embodiment of the invention. The base portion 74 can be formed from a different material that the composite blade portion 46. For example, the base portion 74 can be formed from metal. The base portion 74 and the composite blade portion 46 can be fixed together by bolts or any other suitable means in view of the operation of the composite blade portion 46. Also, a composite blade can be attached to a metal base or spar by either laying it up right on the metal components or by adhesive.

The rotor blade assembly 62 also includes a sheath 76 extending around the composite blade portion 46. The sheath 76 is positioned along the length 64 adjacent to the base portion 74 and between the root 66 and the end point 70 of the leading edge 72. The sheath 76 can be positioned such that combustion gases exiting the exhaust section 22 directly impinge on the sheath 76. The exhaust section 22 can be configured such that exhaust gases are directed relatively precisely at the sheath 76, limiting the likelihood that exhaust gases will contact the composite blade portion 46.

Figure 2:
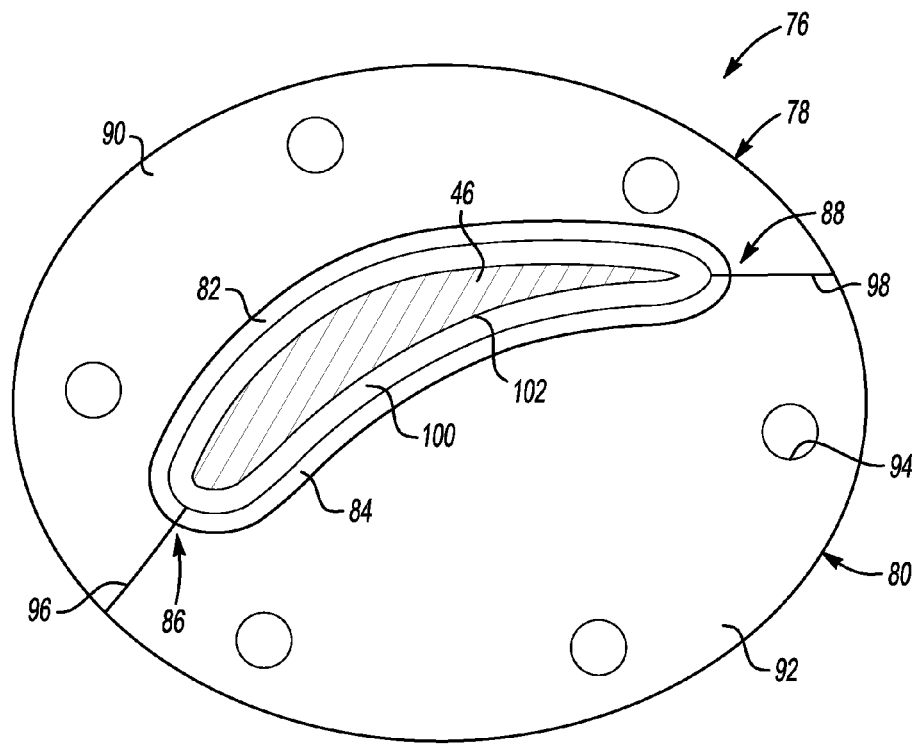
FIG. 2 is a partial schematic view taken along section lines 2-2 shown in FIG. 1.

As shown in FIG. 2, the exemplary sheath 76 can includes first and second halves 78, 80 respectively mountable on opposite sides of the composite blade portion 46. It is noted that sheaths applied in various embodiments of the invention can include "halves" that are substantially mirror images of one another or halves that are not mirror images of one another. The first and second halves 78, 80 can include respective wall portions 82, 84 that encircle the composite blade portion 46 and mesh at opposite ends 86, 88. The first and second halves 78, 80 can also include respective flange portions 90, 92 that define mounting apertures, such as mounting aperture 94. The flange portions 90, 92 can abut one another and define seams 96, 98. The seams 96, 98 can extend through the opposite ends 86, 88. The exemplary sheath 76 can be fixed to the base portion 74 (shown in FIG. 1) with bolts extending through the mounting apertures. The composite blade portion 46 can include a flange portion sandwiched between the flange portions 90, 92 and the base portion 74.

As shown in FIG. 2, the sheath 76 can be spaced outwardly from the composite blade portion 46 along at least part of the length 64 that extends between the root 66 and the end point 70 of the leading edge 72 (all shown in FIG. 1). FIG. 2 shows a void or gap 100 between the wall portions 82, 84 and the composite blade portion 46. The gap 100 can provide insulation for the composite blade portion 46, create a passage for cooling air, and/or tend to isolate the composite blade from debris damage from any debris in the exhaust stream. The gap 100 can extend the entire portion of the length 64 over which the sheath 76 and the composite blade portion 46 overlap or only a portion of the length 64 over which the sheath 76 and the composite blade portion 46 overlap. The gap 100 can extend about the entire perimeter 102 of the composite blade portion 46 or less than the entire perimeter 102.

Figure 3:
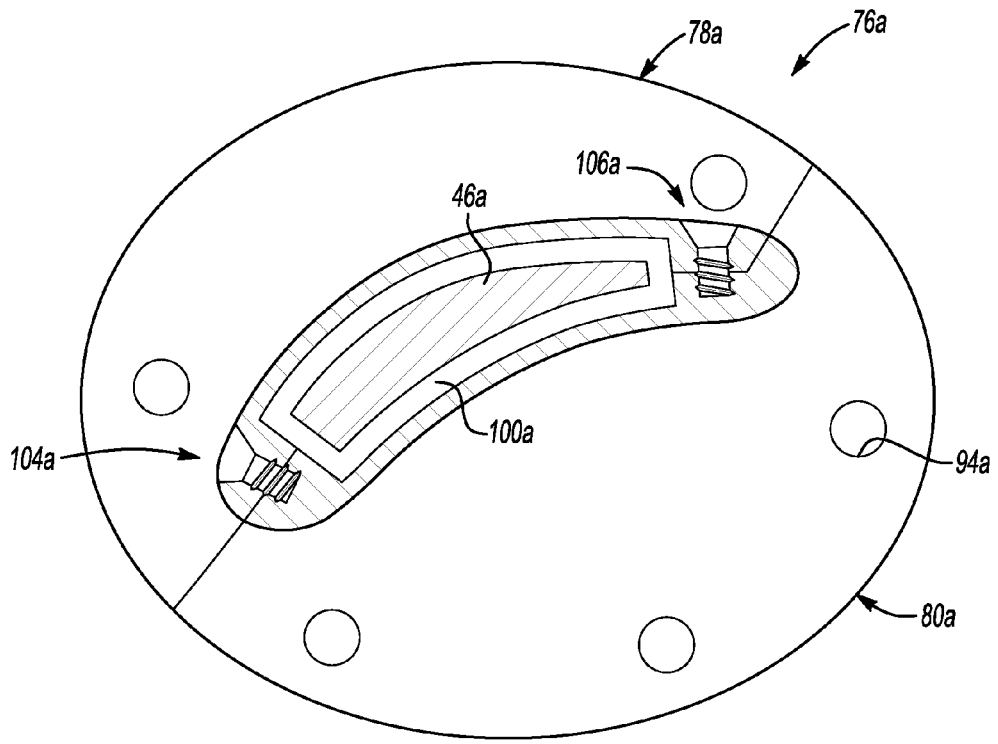
FIG. 3 is a view analogous to FIG. 2 of another embodiment of the invention.

The first and second halves 78, 80 shown in FIG. 1 can be welded together if desired. FIG. 3 shows another embodiment of the invention in which first and second halves 78*a*, 80*a* can be bolted together. During assembly, for example, the second half 80*a* can be fixed to a base portion with fasteners extending through a mounting aperture 94*a*. Next, the first half 78*a* can be fixed to the second half 80*a* with counter-sunk cap screws 104*a*, 106*a*. FIG. 3 also shows a gap 100*a* defined between the sheath 76*a* and the composite blade portion 46*a*.

Figure 4:
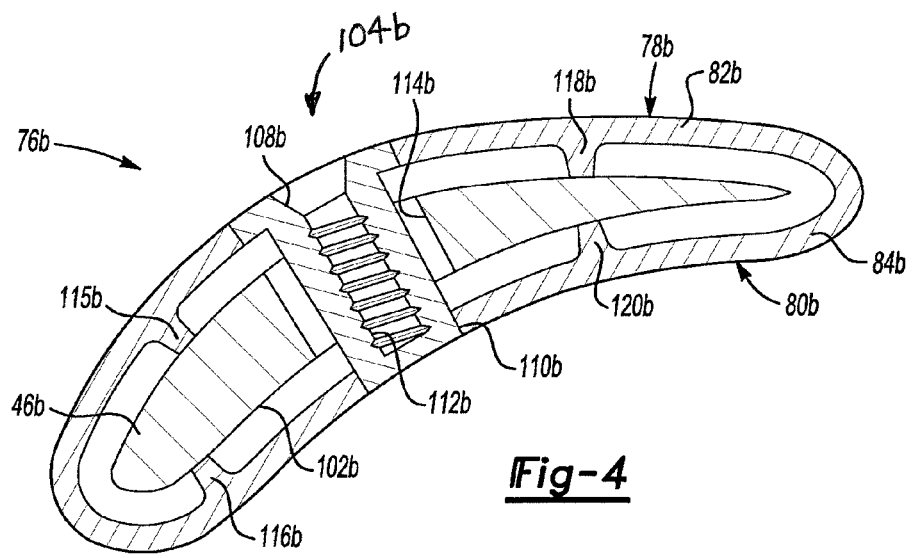
FIG. 4 is a view analogous to FIGS. 2 and 3 of another embodiment of the invention.

FIG. 4 shows another embodiment of the invention is which first and second halves 78*b*, 80*b* can be bolted together through the composite blade portion 46*b*. A wall portion 82*b* of the first half 78*b* can include a counter-sunk aperture 108*b*. A wall portion 84*b* of the second half 80*b* can include a boss 110*b* defining a threaded aperture 112*b*. The boss 110*b* can pass through an aperture 114*b* defined in the composite blade portion 46*b*. A cap screw 104*b* can be received in the apertures 108*b* and 112*b* to connect the first and second halves 78*b*, 80*b*.

FIG. 4 also shows an arrangement in which the sheath 76*b* contacts the composite blade portion 46*b*. The sheath 76*b* is spaced outwardly from the composite blade portion 46*b* about a majority of the perimeter 102*b*. Stand-offs 115*b*, 116*b*, 118*b*, 120*b* are formed in the wall portions 78*b*, 80*b* to maintain the position of the sheath 76*b* relative to the composite blade portion 46*b*. The sheath 76*b* can be carried by the composite blade portion 46*b* via one or more bosses passing through the composite blade portion 46*b* or by some sort of flange with mounting apertures as shown in FIG. 2.

Figure 5:
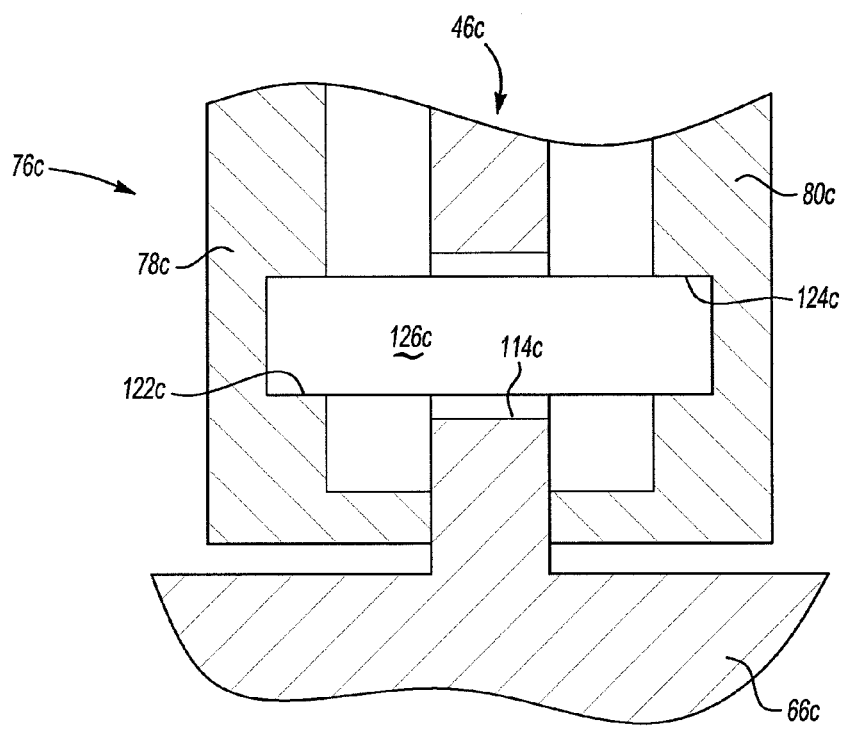
FIG. 5 is a detail view of a connecting arrangement between a sheath and a composite blade portion according to another embodiment of the invention.

FIG. 5 shows another embodiment of the invention is which the sheath is mounted directly on a composite blade portion. The sheath 76*c* includes wall portions 78*c* and 80*c*. The composite blade portion 46*c* includes a root 66*c* operable to connect to a base portion (not shown). An aperture 114*c* extends through the composite blade portion 46*c*. The wall portions 78*c* and 80*c* define apertures 122*c*, 124*c*, respectively, aligned with the aperture 114*c*. A pin 126*c* can extend through the apertures 114*c*, 122*c*, and 124*c* to fix the sheath 76*c* relative to the composite blade portion 46*c*.

Figure 6:
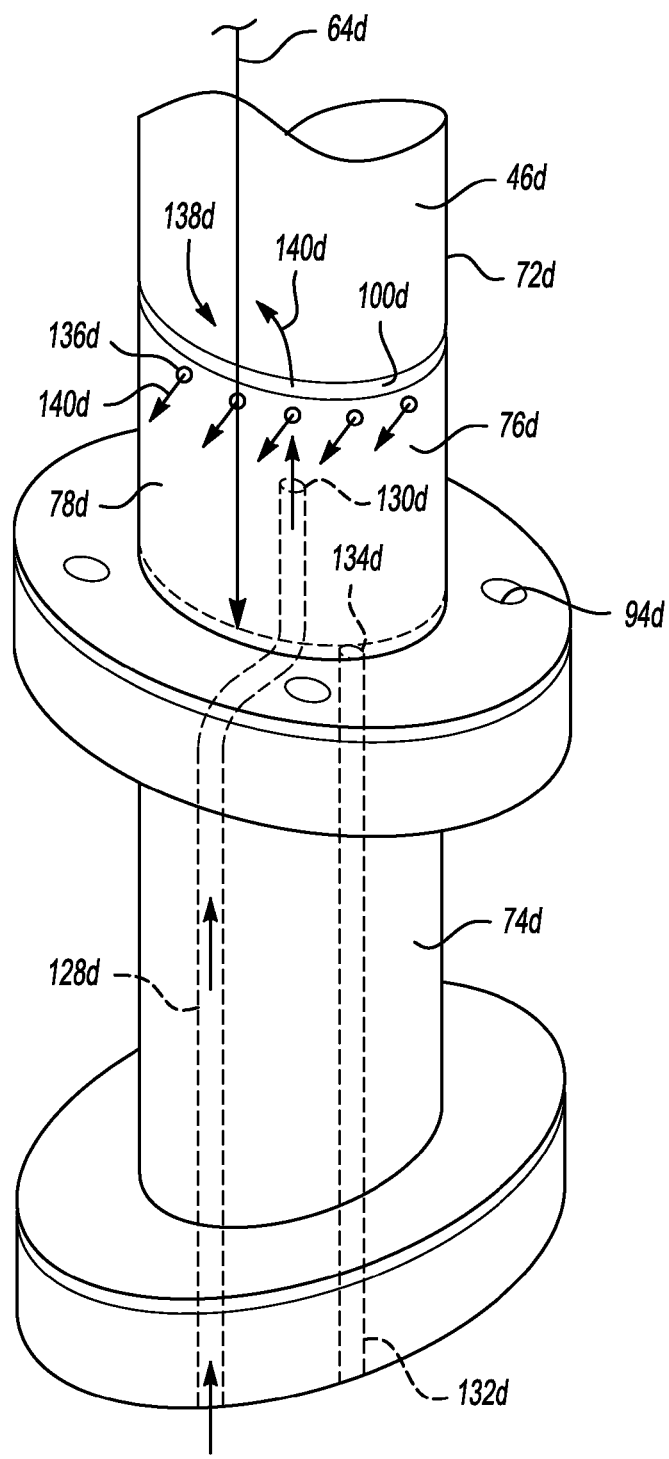
FIG. 6 is a perspective view of another embodiment of the invention in which cooling fluid is directed into a gap between a sheath and a composite blade portion.

Embodiments of the invention can also include a cooling fluid delivery system operable to deliver fluid into the gap 100. FIG. 6 shows another embodiment of an invention in which a composite blade portion 46*d* is fixed to a base portion 74*d*, such as with fasteners extending through mounting apertures 94*d*. A sheath 76*d* encircles a bottom of the composite blade portion 46*d*, radially inward from the leading edge 72*d* relative to an axis of rotation of the composite blade portion 46d (such as an axis 24 shown in FIG. 1). A cooling fluid delivery system can include a conduit 128d having an opening 130d defined by the composite blade portion 46d and positioned in the gap 100d between the sheath 76d and the composite blade portion 46d. The cooling fluid delivery system can be operable to bleed fluid from the compressor section 16 (shown in FIG. 1) and route the fluid through the conduit 128d and into the gap 100d via the opening 130d. Instead of bleed air from the compressor, a separate air pump could supply air, perhaps an electrically driven air pump. Another option would be a passive system that would combine the ram pressure from a forward facing scoop with the centrifugal loading from the rotary motion within the rotor and the radially outward direction of the rotating passages to move air through the air gap.

The conduit 128d can extend through the composite blade portion 46d along at least part of the length 64d over which the composite blade portion 46d and the sheath 76d overlap. Alternatively, the a conduit can be spaced from the composite blade portion 46d along at least part of the length 64d over which the composite blade portion 46d and the sheath 76d overlap. For example, a conduit 132d can include an opening 134d positioned in the gap 100d, spaced from the composite blade portion 46d. Routing the cooling fluid through the composite blade portion 46d, such as with conduit 128d, can be desirable to cool the composite blade portion 46d. Alternatively, routing the cooling fluid to circumvent the composite blade portion 46d, such as with conduit 132d, can be desirable to maintain the composite blade portion 46d as a solid structure.

The cooling fluid can escape or exhaust the gap 100d through an aperture defined at least in part by the sheath 76d. Arrows 140d represent the flow of exhaust cooling fluid. The exemplary sheath 76d can include a plurality of apertures, such as aperture 136d, formed in a wall portion 78d of the sheath 76d and arranged about a perimeter of the composite blade portion 46d. In addition or alternatively, an aperture 138d can be formed in part by the sheath 76d and in part by the composite blade portion 46d. The flanged design shown could provide air passages to the air gap without holes in the base of the composite blade. A seal could be disposed underneath the flange that would circle the cooling passage outlet and the blade. For a flangeless design, holes would have to pass through the base of the airfoil into the air gap.

Another embodiment could be to have the axisymmetric base be metallic with an integral spar that would pass through the sheath and extend up into the base of the composite blade. This would eliminate all composite within the exhaust stream (even in the isolated area inside the sheath) and could make features such as holes through the spar for sheath attachment more feasible due to higher strength.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A rotor blade assembly comprising:
   a composite blade portion extending a length from a root to a tip, wherein a leading edge of said composite blade portion extends from said tip to an end point along said length between said tip and said root;
   a base portion fixed to said composite blade portion proximate to said root; and
   a sheath extending around said composite blade portion and positioned along said length adjacent to said base portion and between said root and said end point of said leading edge,
   wherein said sheath is spaced apart from said composite blade portion by a gap therebetween that extends along the length; and wherein said sheath is mounted on said base portion and/or wherein said sheath is mounted on said composite blade portion.

2. The rotor blade assembly of claim 1 wherein said sheath is spaced outwardly from said composite blade portion along all of a portion of said length between said root and said end point of said leading edge.

3. The rotor blade assembly of claim 1 wherein said sheath is spaced outwardly from said composite blade portion about the entire perimeter of said composite blade portion.

4. The rotor blade assembly of claim 1 wherein said sheath is spaced outwardly from said composite blade portion about a majority of the entire perimeter of said composite blade portion along at least part of a portion of said length between said root and said end point of said leading edge.

5. The rotor blade assembly of claim 1 wherein said sheath includes first and second halves respectively mountable on opposite sides of said composite blade portion.

6. The rotor blade assembly of claim 1 further comprising:
   a conduit including an opening positioned in the gap between said sheath and said composite blade portion along all of a portion of said length between said root and said end point of said leading edge.

7. The rotor blade assembly of claim 6 wherein said conduit extends through said composite blade portion along at least part of said length between said root and said end point of said leading edge.

8. The rotor blade assembly of claim 6 wherein said conduit is spaced from said composite blade portion along most of a portion of said length between said root and said end point of said leading edge.

9. The rotor blade assembly of claim 6 further comprising at least one aperture defined at least in part by said sheath, wherein said at least one aperture is operable to exhaust fluid directed into said gap by said conduit.

10. The rotor blade assembly of claim 9 wherein said at least one aperture is further defined as a plurality of apertures formed in said sheath and arranged about a perimeter of said composite blade portion.

11. The rotor blade assembly of claim 9 wherein said at least one aperture is further defined as formed in part by said sheath and in part by said composite blade portion.

12. A method comprising the steps of:
   extending a composite blade portion a length from a root to a tip, wherein a leading edge of the composite blade portion extends from the tip to an end point along the length between the tip and the root;
   fixing a base portion to the composite blade portion proximate to the root;

extending a sheath around the composite blade portion and positioned along the length adjacent to the base portion and between the root and the end point of the leading edge, wherein said sheath is spaced apart from said composite blade portion by a gap therebetween that extends along the length; and releasably connecting the sheath to at least one of the base portion and the composite blade portion.

13. The method of claim 12 further comprising the step of: directing cooling fluid between the sheath and the composite blade portion.

14. The method of claim 13, wherein said directing step further comprises the step of:

routing the cooling fluid first through the composite blade portion along the length between the root and the end point of the leading edge and second into the gap between the sheath and the composite blade portion.

15. An aircraft propulsion device comprising:

a compressor section;

a combustor section operable to receive compressed fluid from said compressor section;

a turbine section operable to receive combustion gases from said combustor section;

an exhaust section operable to receive combustion gases from said turbine section;

a rotor assembly positioned downstream of said exhaust section and including:

a composite blade portion extending a length from a root to a tip, wherein a leading edge of said composite blade portion extends from said tip to an end point along said length between said tip and said root;

a base portion fixed to said composite blade portion proximate to said root and formed from a different material than said composite blade portion; and a sheath extending around said composite blade portion and positioned along said length between said root and said end point of said leading edge, said sheath positioned such that combustion gases exiting said exhaust section directly impinge on said sheath, wherein said sheath is mounted on said base portion and/or wherein said sheath is mounted on said composite blade portion.

16. The aircraft propulsion device of claim 15 further comprising:

a cooling fluid delivery system operable to bleed fluid from said compressor section and route the fluid to a gap between said sheath and said composite blade portion.

17. The aircraft propulsion device of claim 15 wherein said sheath includes first and second halves respectively mountable around opposite sides of said composite blade portion and each of said first and second halves includes at least one stand-off such that a radial gap is defined at least partially around said composite blade portion between said composite blade portion and said sheath.

* * * * *